United States Patent
Patil et al.

(10) Patent No.: US 10,708,130 B2
(45) Date of Patent: Jul. 7, 2020

(54) COMMON MANAGEMENT FRAMEWORKS

(71) Applicant: Hewlett-Packard Development Company, L.P., Houston, TX (US)

(72) Inventors: Diptesh Patil, Bangalore (IN); Ravindhranad Nagarur, Bangalore (IN); Sujith Prasad, Bangalore (IN); Timothy P Blair, Boise, ID (US); Mark A Fahrenkrug, Waukee, IA (US); Joel Fyan, Boise, ID (US); Honee Mesa, Eagle, ID (US); Sairam Kamatchi Guptha, Bangalore (IN); Hitesh Kumar Gupta, Bangalore (IN); Abhishek Raj, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 397 days.

(21) Appl. No.: 15/748,678

(22) PCT Filed: Nov. 15, 2015

(86) PCT No.: PCT/US2015/061754
§ 371 (c)(1),
(2) Date: Jan. 30, 2018

(87) PCT Pub. No.: WO2017/039730
PCT Pub. Date: Mar. 9, 2017

(65) Prior Publication Data
US 2019/0007266 A1 Jan. 3, 2019

(30) Foreign Application Priority Data
Aug. 28, 2015 (IN) ............................ 4555/CHE/2015

(51) Int. Cl.
*G06F 15/173* (2006.01)
*H04L 12/24* (2006.01)

(52) U.S. Cl.
CPC ...... *H04L 41/0813* (2013.01); *H04L 41/0213* (2013.01); *H04L 41/0853* (2013.01); *H04L 41/12* (2013.01); *H04L 41/22* (2013.01)

(58) Field of Classification Search
CPC ............. H04L 41/0813; H04L 41/0213; H04L 41/0853; H04L 41/12; H04L 41/22
See application file for complete search history.

(56) References Cited

U.S. PATENT DOCUMENTS

| 5,982,994 A | 11/1999 | Mori et al. |
| 6,012,095 A | 1/2000 | Thompson et al. |

(Continued)

FOREIGN PATENT DOCUMENTS

| JP | 2005-050062 A | 2/2003 |
| JP | 2012-238323 | 12/2010 |

OTHER PUBLICATIONS

Xerox CentreWareMC. Printer Management System. Easy Printer Discovery and Management. 2015—1 page.

*Primary Examiner* — Philip B Tran
(74) *Attorney, Agent, or Firm* — HP Inc. Patent Department

(57) ABSTRACT

Examples described herein include methods for configuring deployed devices, such as printers and scanners, across a network. Such methods include parsing a manageable features message received from a deployed electronic device according to a common management framework protocol to determine specifications for a manageable feature of the deployed electronic device, generating a features object comprising the specification for the manageable feature according to the common management framework protocol, associating the features object to the deployed electronic device, generating a user interface based on the features object, and sending configuration message to the deployed (Continued)

electronic device based on user input received through the user interface and the features object.

15 Claims, 4 Drawing Sheets

(56)  References Cited

U.S. PATENT DOCUMENTS

| | | | |
|---|---|---|---|
| 7,433,935 B1 | 10/2008 | Obert | |
| 8,010,661 B2 | 8/2011 | Komine | |
| 9,081,747 B1* | 7/2015 | Tabieros | G06F 9/4411 |
| 2003/0069848 A1 | 4/2003 | Larson et al. | |
| 2008/0178202 A1 | 7/2008 | Blackman et al. | |
| 2008/0244057 A1* | 10/2008 | Kojima | G06F 8/61 |
| | | | 709/223 |
| 2011/0289517 A1 | 11/2011 | Sather et al. | |
| 2013/0279698 A1 | 10/2013 | Bradley | |
| 2014/0156820 A1* | 6/2014 | Moineau | H04L 67/34 |
| | | | 709/223 |
| 2015/0052596 A1 | 2/2015 | Ayanam et al. | |
| 2016/0094398 A1* | 3/2016 | Choudhury | H04L 45/42 |
| | | | 370/254 |
| 2016/0132538 A1* | 5/2016 | Bliss | G05B 21/02 |
| | | | 707/741 |

* cited by examiner

COMMON MANAGEMENT FRAMEWORKS

BACKGROUND

Devices, such as printers, scanners, and network storage devices, can be deployed on a network to provide corresponding functionality to many users in an organization. Such deployed devices can include a number of functions or features that can be configured according to the needs or policies of the organization. The specific manageable features available in particular deployed device can change with firmware updates or upgrades.

DETAILED DESCRIPTION

Figure 1:
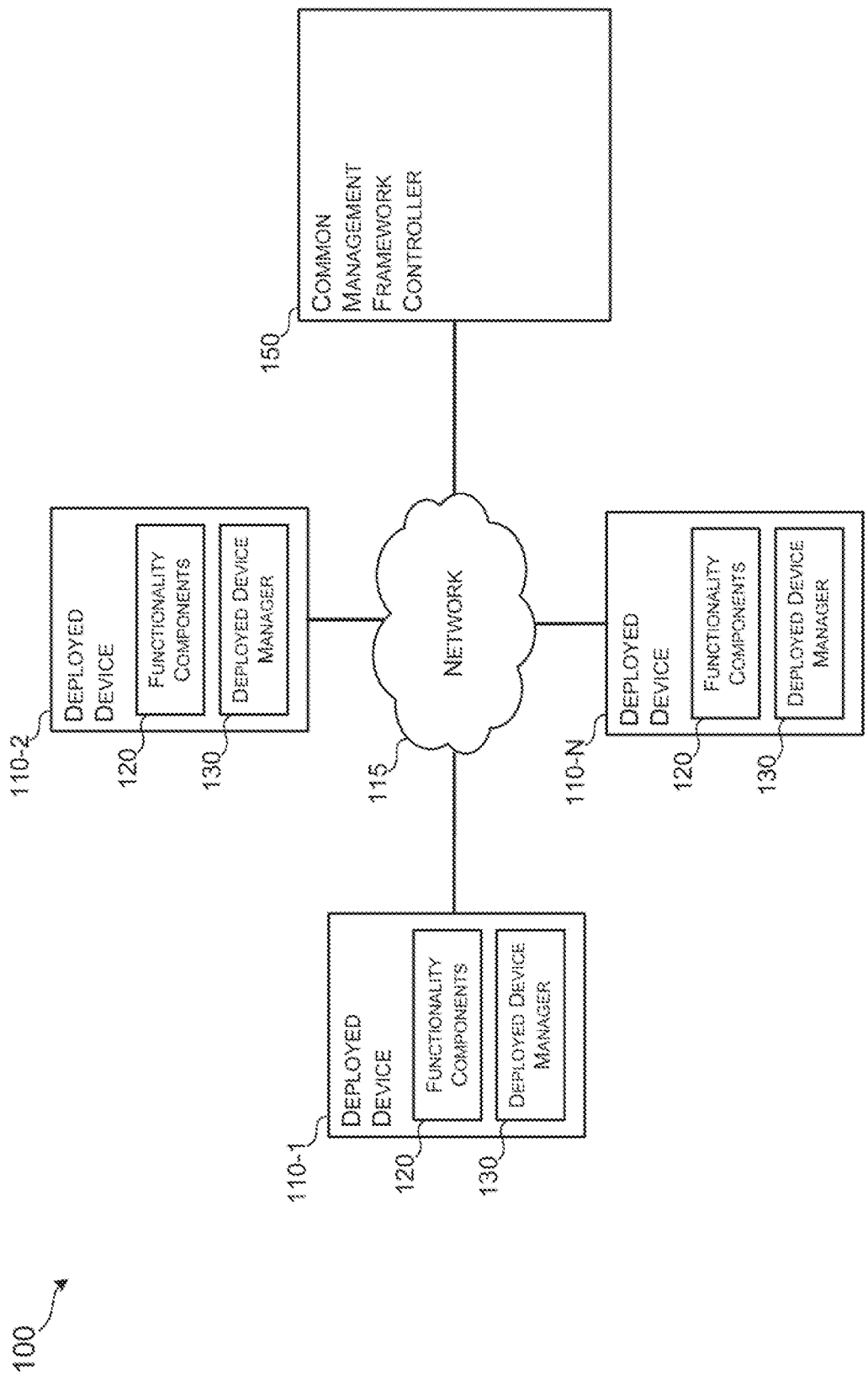
FIG. 1 depicts a schematic diagram of an example common management framework system.

Examples of the present disclosure include systems, devices, and methods for managing electronic devices in a variety of network environments using a common management framework. The common management framework can include definitions for data structures and protocols that can be used by a central CMF controller and deployed devices to communicate and manage features of the deployed devices during setup, upgrades, and repurpose. As used herein, the term "common management framework" can refer to any predetermined set of requirements, instructions, file formats, or messaging protocols with which a CMF controller and/or a deployed device can comply to implement various examples of the present disclosure.

In one example, a common management framework (CMF) controller can be instantiated on a server computer or other computing system. The CMF controller may broadcast a discovery message across a network according to the definitions of a corresponding common management framework. In response to the discovery message, a deployed device, such as a printer, a scanner, a copier, a storage device, a network device, and the like, can establish a communication session with the CMF controller. Once the session is initiated, the deployed device can transmit a manageable features message in compliance with the common management framework. The manageable features message can include information about the features of the deployed device. Such information can include indications as to which features are available to be managed, specifications as to how the features can be configured, and/or definitions or instructions as to how controls for the corresponding the features are to be displayed as configuration items in a user interface.

The information in the manageable features message can be updated, modified, or amended based on the state or version of executable code or electronic files stored in of the deployed device. The manageable features message can be implemented as a single file or signal in a standard structure or format the CMF controller can parse and/or store. For example, the format of the manageable features message can be defined in a configuration file stored in the deployed device by the manufacturer or distributor. In some implementations, the configuration file can be included in firmware stored in a non-volatile computer readable medium included in the deployed.

Upon receipt of a manageable features message, the CMF controller can parse the information for a particular deployed device to determine which features are available, how to configure those features, and how the corresponding controls in a user interface should be displayed. The CMF controller can generate a features object that can include any or all of the information in the manageable features message and associate it with the deployed device from which the manageable features message was received. The CMF controller can then use the features object to generate a corresponding user interface through which a user can input configuration settings for the corresponding manageable features.

Such implementations of the present disclosure avow for deployed devices that use a common management framework to inform the CMF controller of changes in the available manageable features. For instance, scenarios in which of a firmware update or hardware upgrade change the available manageable features for a particular deployed device, the corresponding configuration file or data can also be updated to reflect those changes. The configuration data can then be used to send a new manageable features message to the CMF controller. The information that the CMF controller uses to manage the manageable features can be included in the manageable features message. Thus, when a manageable features is added, removed, or otherwise changed, the CMF controller used to manage that device can be updated by a new manageable features message. Accordingly, the CMF controller need not be updated independently for revisions to the configuration file or firmware in the common management framework compliant deployed devices. Such implementations can reduce the time and effort spent on maintaining the CMF controller, thus simplifying the update process and management of the deployed devices.

FIG. 1 depicts an example system 100 that includes multiple deployed devices 110 and a CMF controller 150, according to examples of the present disclosure. As shown, each of the deployed devices 110 can be coupled to a network 115. In addition, the CMF controller 150 can also be coupled to the network 115.

The network 115 can include any type of electronic communication media or protocol, such as a local area network (LAN), a wide area network (WAN), a wireless network, a virtual private network (VPN), a local bus (e.g., universal serial bus or "USB"), or the like. For example, the network 115 can include a wired communication network implementing any variant of the IEEE 802.3 or other Ethernet type network protocol. In some examples, a wired communication connection can include a USB or other serial or parallel communication protocol. In other examples, the network 115 can include a wireless communication network, such as wireless networks or connections implementing any variant of the IEEE 802.11 (e.g., Wi-Fi™) or IEEE 802.15.1 (e.g., Bluetooth™) wireless networking protocol. In any such example implementations, the network 115 can include optical, electromagnetic, and/or electrical signals transmitted and received using corresponding media and protocols. As such, the network 115 can include multiple networks. For example, the network 115 can include some deployed devices 110 connected to Ethernet connections, some deployed devices 110 connected to a Wi-Fi™ router, and/or some deployed devices 110 in communication with one another using Bluetooth™ type connections.

The deployed devices 110 can include any type of electronic device. For example, the deployed devices 110 can include devices and appliances, such as printers, scanners, fax machines, multifunction printer-scanner-fax machines (e.g., "all-in-ones"), network storage devices, and the like.

As shown, each one of the deployed devices 110 can include various components. In some implementations, the components of the deployed devices 110 can be characterized as functionality components 120 that include the hardware and executable code for implementations of the device specific functionality of the device, and deployed device manager 130 type functionality.

For example, the functionality components 120 of one particular deployed printer can include hardware, such as a printhead, paper handler, network cards, and corresponding electronic components and memories comprising computer executable code for implementing any or all of the printer related functionality. The deployed device manager 130 can include functionality for configuring the manageable features of the deployed device 110 and/or the functionality components 120. The deployed device manager 130 can communicate with the CMF controller 150 through the network 115 to obtain user configurable settings for the functionality components 120 and/or the deployed device 110. For example, the deployed device manager 130 can generate a manageable features message in compliance with a common management framework and information about the manageable features of the deployed device 110. The information about the manageable features of the deployed device 110 can be included in the firmware implemented in the deployed device 110.

In response to the manageable features message sent to the CMF controller 150, the deployed device manager 130 can receive a configuration settings command or message in compliance with the common management framework. The deployed device manager 130 can then apply the settings to the functionality components 120 and/or the deployed device 110. In one example implementation, the deployed device manager 130 in a multifunction device can receive and apply user configurable settings to set the defaults color print mode and/or default scanner resolutions.

In various implementations described herein, the CMF controller 150 can be implemented as any combination of hardware and executable code. For example, the functionality of the CMF controller 150 can be implemented as executable code executed in a processor of computer system or other computing device. This executable code, stored on a nonvolatile computer readable medium, can include instructions for operations that when executed by a processor causes the processor to implement the functionality described in reference to the CMF controller 150 and/or its subcomponents. Accordingly, CMF controller 150 can be implemented in a computer system comprising a processor, a memory, a communication interface, and/or other digital or analog logic circuits that can be used to store and/or execute operations defined by executable code or code segments.

The processors of the computer system may be a microprocessor, a micro-controller, an application specific integrated circuit (ASIC), or the like. According to an example implementation, the processor is a hardware components, such as a circuit. The memory can include any type of transitory or non-transitory computer readable medium. For example the memory can include volatile or non-volatile memory, such as dynamic random access memory (DRAM), electrically erasable programmable read-only memory (EE-PROM), magneto-resistive random access memory (MRAM), memristor, flash memory, floppy disk, a compact disc read only memory (CD-ROM), a digital video disc read only memory (DVD-ROM), or other optical or magnetic media, and the like, on which executable code may be stored.

In some implementations, the CMF controller 150 can be instantiated on a server computer or a virtual computer in a cloud computing environment. In other implementations, the CMF controller 150 can be implemented as an application specific integrated circuit (ASIC). In yet other implantations, the CMF controller 150 can be implemented as executable code, also referred to as firmware, stored in a non-volatile computer readable medium, such as electrically erasable programmable read-only memory (EEPROM) in a computing system or other computing device (e.g., a server computer, a desktop computer, laptop computer, tablet computer, etc.).

Figure 2:
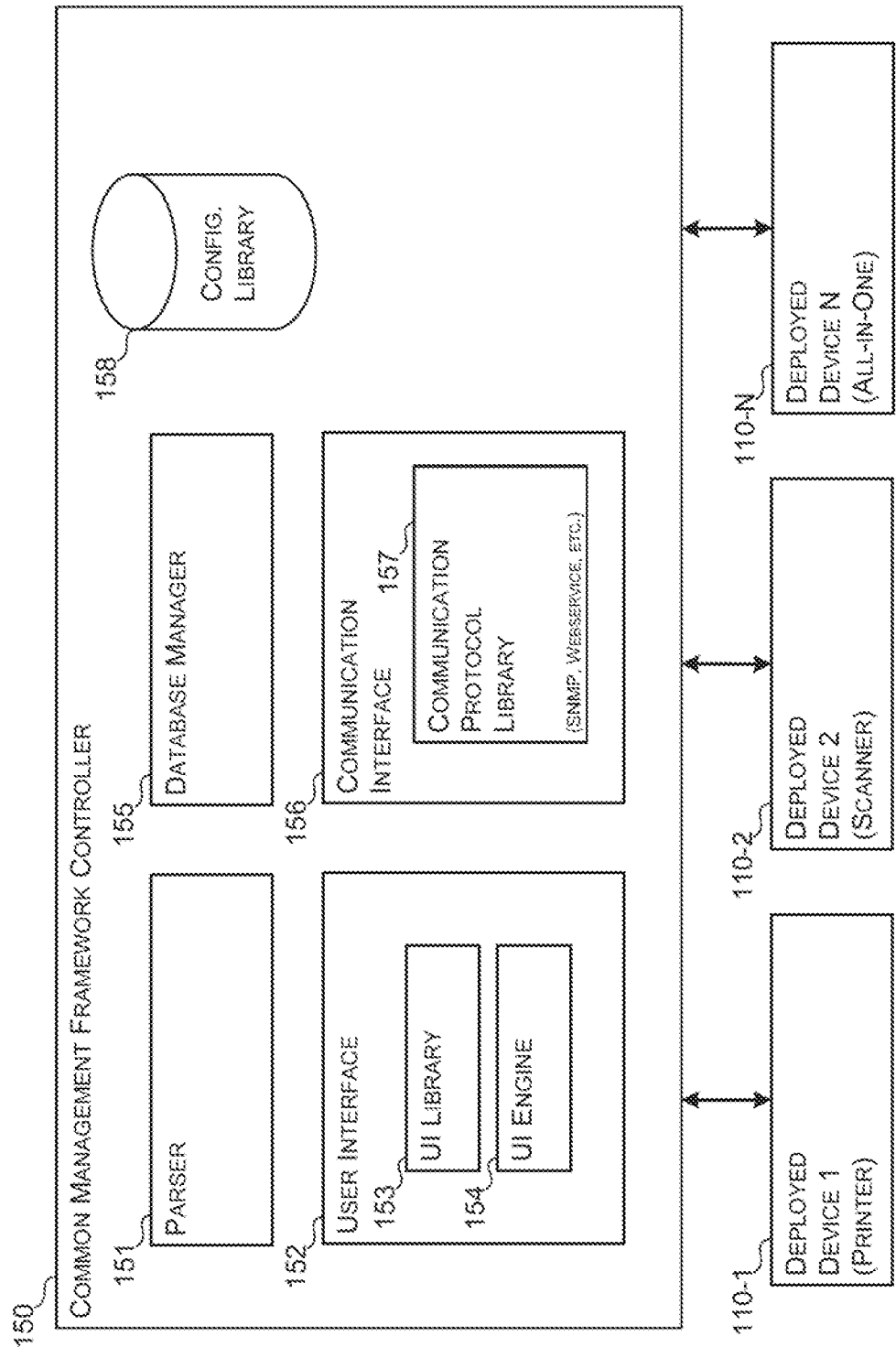
FIG. 2 depicts an example CMF controller.

FIG. 2 depicts a schematic diagram of the CMF controller 150 and several example deployed devices 110 to which it is connected. As illustrated, the CMF controller 150 can include a number of components. Such components can include, but are not limited to, a parser 151, a user interface 152, a database manager 155, a communication interface 156, and a configuration library 158. In various implementations, the CMF controller 150 can be implemented with more or fewer components than shown in FIG. 2. In addition, the components of the CMF controller 150 are shown as individual subcomponents, however, any of the described subcomponents can be merged into any number of composite subcomponents. For example, the database manager 155 and the configuration library 158 can be merged into a single subcomponent.

The deployed devices 110, as described herein, can include any type of electronic device or appliance that cart communicate with the CMF controller 150 over a corresponding network 115 or communication protocol. As shown, the CMF controller 150 can be coupled to and/or in communication with as many as N, where N is an integer, deployed devices 110. Examples of deployed devices described herein can include printers, scanners, and all-in-one devices that include multiple functions.

Various implementations of the present disclosure began when a deployed device 110 is discovered by the CMF controller 150. The discovery of the deployed devices 110 can be initiated either by the CMF controller 150 or the deployed devices 110. For example, in one of the mentation, the communication interface 156 can broadcast a discovery message across a network 15. The discovery message can include any information required the common management framework and formatted according to the requirements of the common management framework. For example, the discovery message can include an indication or command for a receiving deployed device 110 compliant with a particular common management framework protocol or version to respond with a corresponding manageable features message. The details of the corresponding manageable features message will be described in more detail in reference to FIG. 3 below.

In some implementations, the communication interface 156 can include any combination of hardware and executable code. For example, the communication interface 156 can include a network communication card that includes a transceiver for communicating over a corresponding network 115. In related implementations, the communication interface 156 can also include executable code executable by a processor for controlling the communication card for sending and receiving messages in compliance with the common management framework to and from a deployed device 110.

The communication interface 156 can also include a communication protocol library 157. The communication protocol library 157 can include information for any number of protocols, such as simple network management protocol (SNMP), web service, and the like. Accordingly, the communication interface 156 can use the various communication protocols stored in the communication protocol library 157 to broadcast a discovery message to a variety of deployed devices 110 that implement various corresponding communication protocols.

In response to the discovery message, the parser 151, or other component of the CMF controller 150, can receive a manageable features message from a deployed device 110. The parser 150 can parse and/or analyze the information in the manageable feature message received from the deployed device 110 according to the applicable common management framework. As such, the parser 151 can determine information from the manageable feature message regarding which features are available for configuration, how those features can be configured, and/or information regarding how those features should be depicted in a corresponding device management user interface. Such information can be determined on a per deployed device 110 basis.

When a manageable features message is parsed and/or analyzed to determine the manageable features, configuration settings, and/or user efface requirements, the parser 151 can generate a corresponding features object that includes all such information. The features object can then be associated with the deployed device 110 from which the manageable features message was received. For example, the features object generated based on the manageable features message can be associated with a serial number, model number, manufacturer name, device description, firmware version, MAC address, network address, or any other information that can be used to specifically identify the deployed device 110 from which the corresponding manageable features message was received. The database manager 155 can record the association between the features object and the particular deployed device 110. The database manager 155 can store the recorded association in the configuration library 158.

In some implementations, the features object can include any combination of a user interface object, a communication object, and/or a database object. The features objects, and/or any of its component objects, can be associated with a device model identifier and/or a firmware version of device.

Using a features object associated with a particular deployed device 110, the user interface 152 can generate a user interface through which a user can enter in user preferences and/or policy requirements for a particular deployment of the deployed device 110. For example, the user interface can include a user interface library 153 that includes templates and/or requirements for the user interface for entering the configuration settings for particular deployed device 110. For example, the user interface library 153 can include various branding, version numbers, and user specific settings that the user interface engine 154 can use to generate a corresponding user interface.

In some implications, the user interface 152, or one of its subcomponents, can retrieve or receive a feature object from the database manager 155 and/or configuration library 158 for a user-specified deployed device 110. For example, a user can initiate configuration of a particular deployed device 1 110-1 by submitting a unique identifier (e.g., a serial number, network address, device name, etc.) associated with the desired device. The user interface 152 can request database manager 155 and/or configuration library 158 retrieve a features object associated with the desired device. User interface 152 can then generate a number of data specific fields, controls, and other user interface control mechanisms.

For example, the features object can indicate that some device configuration settings must be entered as a string that includes no special characters (e.g., a device name or a plain language description of a location) while other device configuration settings are to be entered as an integer controlled by a slider bar (e.g., an integer value associated with a particular density setting for printing). The user interface engine 154 using the information in the feature object for the particular device and/or information in the user interface library 153 can generate and/or render a corresponding user interface for entering configuration settings for the desired device.

In some implementations, the user interface 152 can render a graphical user interface on a display device associated with the computing system in which the CMF controller 150 is instantiated. In other implementations, the CMF controller 150 can be instantiated on a remote computing system. In such implementations, the user interface 152 can generate data corresponding to the user interface generated in accordance with the features object that can be accessed using an appropriate client application or web browser instantiated on a remote client computing device and/or on the corresponding deployed device 110.

A user, such as a network administrator or end user, can access the user interface for the particular deployed device 110 to enter the desired configuration settings. For example, the configuration settings can include settings that comply with the policies of a particular entity or organization. Such policies can include security information. Such security information can include restrictions on which users are allowed to access/use the deployed device 110, through which networks 115 the deployed device can be accessed, or restrictions on how the configuration settings may be altered locally or remotely. The policies can also include more functional information, such as default settings or preferences for the operation of the deployed device 110. For example, the policies can define whether a printer automatically prints on both sides of the page, whether a scanner can email scanned documents to external email addresses, and the like.

Figure 3:
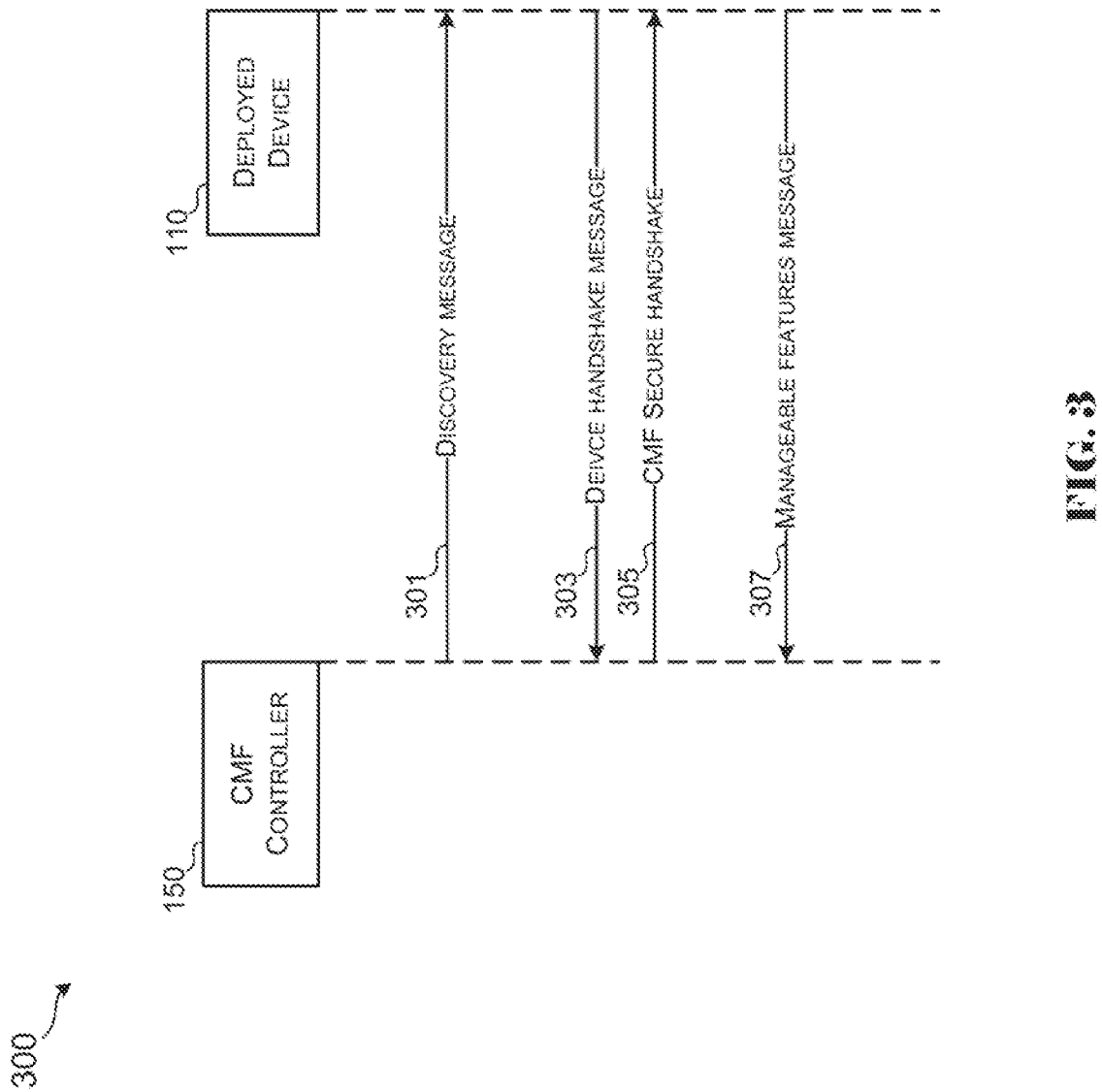
FIG. 3 depicts an example dataflow for discovering manageable features in a deployed electronic device implemented using a common management framework.

FIG. 3 depicts an example dataflow between a CMF controller 150 and a deployed device 110. As described herein, a discovery procedure can begin with a CMF controller 150 initiating a discovery message 301 that includes a request and a message format in compliance with a common management framework. In some implementations, the network address for the desired deployed device 110 can be provided to the CMF controller 150. In such implementations, a discovery message specifically targeting the desired deployed device 110 can be sent using the specified network address on network 115. In other implementations, the discovery message can be broadcast to all deployed devices 110 on the network 115.

In response to the discovery message 301, the deployed device 110 and the CMF controller 150 can conduct a secure handshake session. The secure handshake session can include messages sent between a deployed device 110 and the CMF controller 150 to establish a secure communication session. For example, in response to the discovery message 301, the deployed device 110 can return a device handshake message 303. The device handshake message 303 from the deployed device 110 can include various security protocols according to the corresponding common management framework implemented by the CMF controller 150. Accordingly, in response to the device handshake message 300, the CMF controller 150 can respond with a common management framework secure handshake message 305. As such, the common management framework secure handshake message 305 can be used by the deployed device 110 to establish a secure connection with the CMF controller 150.

Once the connection is established between the CMF controller 10 and the deployed device 110, the deployed device 110 can generate and send a manageable features message 307 to the CMF controller 150. In various implementations of the present disclosure, the manageable features message 307 can include an electronic signal generated according to a predetermined and/or standard format that includes details for the manageable features of the deployed device 110. For example, the manageable features message 307 can include information that specifies which features of the deployed device 110 can be managed. In particular, the manageable features message 307 can include information that specifically identifies the manageable features of the deployed device 110 that can be managed by implementations of the CMF controller 150. For example, the manageable features message 307 can indicate printer features that can be managed, how the printer features can be configured, and how the printer features are to be displayed as configuration items in a user interface to an end-user.

As described herein, the information in the manageable features message 307 can be updated, modified, or amended depending on the version of the operating system and/or firmware installed in the corresponding deployed device 110. In various implementations, the manageable features message 307 can be implemented as a single file. Such files can include a standard structure according to a corresponding common management framework that the CMF controller can parse and store.

When the CMF controller 150 receives the manageable features message 307, it can initiate to various processes to generate a corresponding user interface through which a user can enter configuration settings for the manageable features indicated in the manageable features message 307. The details of the processes are described in more detail in reference to the flowchart of an example method 400 depicted in FIG. 4.

Figure 4:
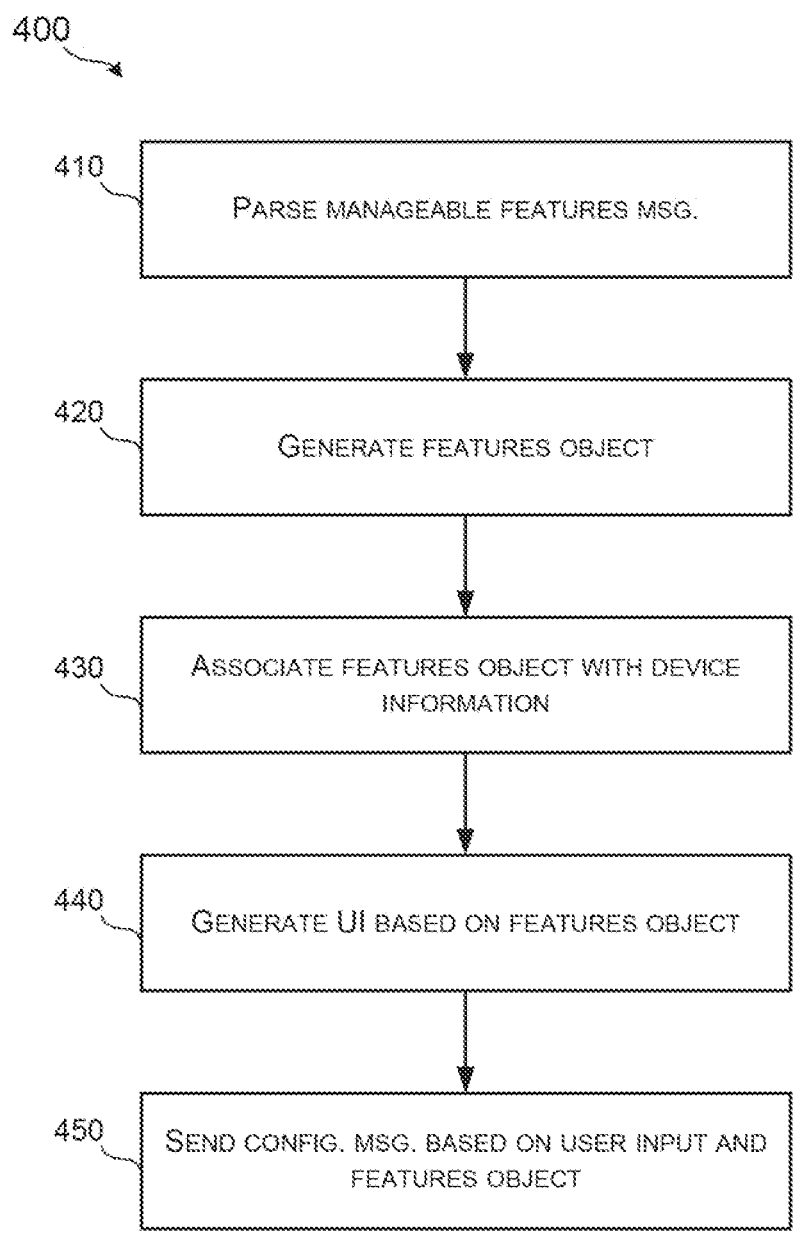
FIG. 4 is a flowchart of an example method for managing the manageable features in a deployed device using a common management framework.

The method 400 of FIG. 4 can begin at box 410, in which the CMF controller 150 can parse a manageable features message 307 received from a deployed device 110. Parsing the manageable features message 307 can include parsing the information for the configurable features of the deployed device 11 according to a standardized message format of a corresponding common management framework. Accordingly, parsing the manageable features message 307 can include determining an identifier, network address, serial number, model number, firmware version, and descriptions and other specifications for the manageable features of that particular deployed device 110.

At box 420, the CMF controller 150 can generate a corresponding features object using the information parsed from the manageable features message 307. As described herein, the features object can include a user interface object, the communication object, and a database object. Each of the components of the features object can include information usable by the CMF controller 150 for a particular purpose of various implementations of the present disclosure. For example, the user interface object can include specifications for how the features included in the features object are to be depicted in a corresponding user interface. The communication object can include specifications regarding how the CMF controller 150 should communicate with the deployed device 110. The database object can include information that links the specific manageable features of the deployed device 110 with an identifier that can individually or by class identify the deployed device 110.

Accordingly, the three component objects of a features object can be linked to a specific information (e.g., an identifier) for a deployed device 110 or a class or type of deployed devices 110, at box 430. For example, the features object can be associated with a serial number and/or MAC address of the deployed device 110. In other implementations, the features object can be linked to a model number or firmware version of the deployed device 110 (e.g., a printable model number and the firmware revision number installed on the printer).

At box 440, the CMF controller 150 can generate a user interface based on the features object. As such, the CMF controller 150 can render a user interface that includes fields and other user interface controllers for any or all of the configurable features of the deployed device 110 according to the requirements of the corresponding information in the features object. For example, the features object may include an indication regarding the order in which the configurable features of the deployed device 110 should be depicted in a corresponding managements user interface.

Such an order can include an indication that the name, location, serial number, network address, permissions, and other identifying information should be listed first in the user interface. The features object can also indicate which order specific controls for various configurable settings should be displayed in a corresponding user interface. In the case of a deployed network printer, a corresponding features object can group print settings, such as color settings, density settings, media handling settings and the like, can be required by the features object to be grouped in one section of the user interface. Features that have to do with user access, security, power conservation, and the like may be required by the features object to be displayed in one or more other sections in a particular order. In all such implementations, the features objects can define what would be an acceptable setting for each of the manageable features. For example, the features objects can require that a network setting include a particular format for a network location (e.g., an IP network separated into the requisite number of groups of integers).

Once the user interface for the manageable features of a particular the deployed device 110 is generated according to the corresponding features object, the CMF controller 150 can receive user input for any of the configurable settings. For example, when a user selects a particular feature in the manageable features user interface, the user interface engine 154 can retrieve the user interface object from the corresponding features object. The user interface engine 154 can then reference the user interface library 153 and/or the user interface object to render the corresponding user interface.

At box 450, the CMF controller 150 can generate and send a configuration message to the desired deployed device 110 based on the user input and the communication object and/or database object of the corresponding features object. For example, the communication interface 156 of the CMF controller 150 can access the communication object of the features object to determine which communication is should use to communicate the settings received from the user. For example, if the communication object indicates that SNMP has been selected for communication with the desired deployed device 110, then the CMF controller 150 can generate a request message based on the user inputs, the SNMP protocol retrieved from the communication protocol library 157, and SNMP OID for the deployed device 110 in the communication object. The request message can include commands for the target deployed device 110 to apply the user input settings to the device. CMF controller 150 can then send the request message to the deployed device 110 with request to apply the settings.

In response to the request message, the target deployed device 110 can apply the settings and then send an indication back to the CMF controller 150 regarding the success of the application of the settings. If the applications of the settings are successful, the response message can include indication of success. In response to the indication success, CMF controller can store an indication of the current configuration settings for that particular deployed device 110 in the configuration library 158. Accordingly, the CMF controller 150 can retrieve the current states of a common management configuration framework compliant deployed device by accessing the configuration library 158. However, if the response message it's includes an indication that the settings were not successfully applied to the deployed device 110, the CMF controller 150 can reattempt the request message until a response message indicating success is received.

In various implementations of the present disclosure, the response message and/or an indication of successful application of the settings can vary or include indications of partial success. For instance, if only some of the settings can be applied, due to the state, previous settings, firmware version, or capabilities of the deployed device, the response message can include an indication as to which of the settings were successfully applied and/or which settings were not successfully applied. In some implementations, if the deployed device 110 is able to apply less than all of the settings indicated in the configuration message, then it can still send a response message that indicates a successful application of the settings.

To provide such capabilities, the deployed device 110 can be configured to comply with a "relaxed parsing" specification. Relaxed parsing allows the deployed device 110 to verify successful application of settings despite errors. For example, if a particular deployed device 110 received a configuration message that include an instruction to apply a particular setting which is not applicable to that device (e.g., a single platen scanner device without an automatic document feeder receives a configuration message to apply a setting that specifies a setting for an automatic document feeder), then it can simply skip over that setting.

In some implementations, the deployed device 110 can stop applying a group of settings when it encounters an error in applying one of the settings. However, relaxed parsing allows the deployed 110 device to attempt to apply the settings on a "best effort" basis. That is, the deployed device 110 can continue to the next setting in a configuration message even if the previous setting in the configuration message was not or could not be successfully applied (e.g., the setting was not applicable to the device). As such, in some implementations, the relaxed parsing specification can include instructions that when executed by the deployed device 100 cause it to use a best effort application of the settings.

Such implementations allow for management of many deployed devices 110 in a batch mode according to preconfigured policies. The preconfigured policies can be used by the CMF controller 150 to generate a configuration message that includes various settings that may be usable by a larger group of deployed devices 110 based on a common characteristic (e.g., device type, device manufacturer, device location, device use, etc.). Any settings in the configuration message generated based on the policies not applicable to a particular deployed device 110 can be ignored by the device without resulting in an error.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. All of the features disclosed in this specification (including any accompanying claims, abstract and drawings), and/or all of the elements of any method or process so disclosed, may be combined in any combination, except combinations where at least some of such features and/or elements are mutually exclusive.

We claim:

1. A computing device comprising:
    a processor; and
    a non-transitory computer readable medium coupled to the processor and comprising instructions that when executed by the processor cause the processor to:
        broadcast a discovery message on a communication network according to a common management framework protocol;
        conduct a secure handshake session according to the common management framework protocol with a plurality of deployed devices;
        receive, in response to the discovery message, a plurality of manageable features messages from the plurality of deployed devices in compliance with the common management framework protocol, each of the plurality of manageable features messages comprising a plurality of manageable feature specifications for a corresponding deployed device in the plurality of deployed devices; and
        generate a plurality of features objects corresponding to the plurality of manageable feature specifications in accordance with the common management framework protocol, each of the plurality of features objects comprising configuration specifications and user interface specifications for a corresponding manageable feature specification in the plurality of manageable features specifications.

2. The computing device of claim 1 wherein the instructions further cause the processor to associate each of the plurality of features objects with information specific to a corresponding deployed device in the plurality of deployed devices.

3. The computing device of claim 2 wherein the instructions further cause processor to:
    generate a user interface based on a subset of features objects in the plurality of features objects associated with information specific to a selected corresponding deployed in the plurality of deployed devices; and
    send a configuration message to the selected corresponding deployed device based on user input received through the user interface and at the subset of features objects.

4. The computing device of claim 1 wherein the common management framework protocol comprises definitions storable in firmware of the plurality of deployed devices.

5. The computing device of claim 1 wherein the plurality of deployed devices comprises a deployed device comprising updated firmware for additional or altered features.

6. The computing device of claim 1 wherein the plurality of deployed devices comprises a deployed device with which the computer system has not previously conducted the secure handshake session.

7. A method comprising:
- parsing, by a computer system, a manageable features message received from a deployed electronic device according to a common management framework protocol to determine specifications for a manageable feature of the deployed electronic device;
- generating, by the computer system, a features object comprising the specification for the manageable feature according to the common management framework protocol;
- associating, by the computer system the features object to the deployed electronic device;
- generating, by the computer system, a user interface based on the features object; and
- sending, by the computer system, configuration message to the deployed electronic device based on user input received through the user interface and the features object.

8. The method of claim 7, further comprising updating the features objects based on the user input and a response message received in response to the configuration message.

9. The method of claim 8, wherein the response message comprises an indication that the deployed electronic device successfully applied configuration settings based on the configuration message.

10. The method of claim 7, wherein the manageable features message comprises information corresponding to configurable functionality specific to the deployed electronic device in a format defined tar the common management framework protocol.

11. The method of claim 7, wherein the features object defines a user interface property, a communication property, and feature details associated with the manageable feature in a format defined by the common management framework protocol.

12. The method of claim 7, wherein the common management framework protocol comprises definitions storable in firmware of a plurality of disparate deployed electronic devices and usable by the plurality of disparate deployed electronic devices to generate corresponding manageable features messages.

13. An electronic device comprising:
- a processor; and
- a memory comprising executable code comprising in that when executed by the processor cause the processor to:
  - monitor for a discovery message broadcast in compliance with a common management framework protocol from a remote computing system on a communication network to which the electronic device is coupled;
  - conduct a secure handshake session with the remote computing system according to the common management framework protocol in response to the discovery message; and
  - send a manageable features message in compliance with the common management framework protocol and comprising a plurality of manageable feature specifications for the electronic device.

14. The electronic device of claim 13, wherein the instructions further cause the processor to:
- receive a configuration command based on the manageable features message and the common management framework protocol; and
- change a setting for the operation of the electronic device in response to the configuration command.

15. The apparatus of claim 14, wherein the instructions that cause the processor to change the setting are compliant with a relaxed parsing specification.

* * * * *